United States Patent [19]

Kominami et al.

[11] 3,887,608
[45] June 3, 1975

[54] PROCESS FOR PREPARING PHENYL ACETATE AND RELATED PRODUCTS

[75] Inventors: Naoya Kominami, Tokyo; Nobuhiro Tamura, Saitama; Etsuo Yamamoto, Tokyo, all of Japan

[73] Assignee: Asahi Kasei Kogyo Kabushiki Kaisha, Japan

[22] Filed: Nov. 30, 1972

[21] Appl. No.: 310,894

Related U.S. Application Data

[63] Continuation-in-part of Ser. No. 42,903, June 2, 1970, abandoned, and Ser. No. 98,889, Dec. 16, 1970, abandoned.

[30] Foreign Application Priority Data

| | | |
|---|---|---|
| June 9, 1969 | Japan | 44-44644 |
| June 9, 1969 | Japan | 44-44645 |
| Nov. 5, 1969 | Japan | 44-88113 |
| Feb. 4, 1970 | Japan | 45-9304 |
| Nov. 17, 1969 | Japan | 44-91460 |
| Dec. 27, 1969 | Japan | 44-104827 |
| Aug. 13, 1970 | Japan | 45-70419 |

[52] U.S. Cl. ............... 260/479 R; 252/438; 260/645
[51] Int. Cl. ............................................. C07c 69/14
[58] Field of Search ................................. 260/479 R

[56] References Cited
UNITED STATES PATENTS 3,578,698   5/1971   Hayden ............................... 260/475

FOREIGN PATENTS OR APPLICATIONS

| | | |
|---|---|---|
| 6,704,757 | 10/1967 | Netherlands |
| 6,812,891 | 3/1969 | Netherlands |
| 1,419,966 | 10/1965 | France |
| 1,509,372 | 12/1967 | France |
| 1,547,326 | 10/1968 | France |
| 1,563,257 | 3/1969 | France |

OTHER PUBLICATIONS

Ichikawa et al., J. Chem. Soc. Japan, Pure Chem. Sect., Vol. 90 (Feb. 10, 1969), pages 212–215.

Davidson et al., Chemistry and Industry (Aug. 12, 1967), pg. 1361.

*Primary Examiner*—James A. Patten
*Attorney, Agent, or Firm*—Craig & Antonelli

[57] ABSTRACT

Acetates of aromatic compounds which are useful as the material for preparing hydroxy aromatic compounds such as phenols or other derivatives, and are prepared in one step and in remarkably high yield from aromatic compounds such as benzene or lower alkyl derivatives thereof, by reacting them with acetic acid and a molecular oxygen containing gas in the presence of a catalyst of Pd or its compounds, and $HNO_3$ or alkali metal salts thereof.

25 Claims, No Drawings

PROCESS FOR PREPARING PHENYL ACETATE AND RELATED PRODUCTS

This is a continuation-in-part application of our prior U.S. application Ser. No. 42,903 filed on June 2, 1970, and now abandoned and copending U.S. application Ser. No. 98,889 filed on Dec. 16, 1970, now abandoned.

This invention relates to a process for preparing acetates of aromatic compounds.

Acetates of aromatic compounds, i.e. the final products of the present invention, are readily hydrolyzed to hydroxy aromatic compounds. Furthermore, acetates of aromatic compounds are more stable to oxidation than hydroxy aromatic compounds. They are useful as intermediates from which various compounds are easily derived (e.g. oxidation product of tolyl acetate of which the side chain methyl is oxidized).

Belgian Pat. No. 696,832 discloses a process for preparing phenyl acetates from benzenes in one step using metallic palladium. Belgian Pat. No. 721,282 discloses a process for preparing acetates of condensed aromatic compounds from condensed aromatic compounds in one step using metallic palladium. British Pat. No. 1,167,428 discloses the similar process using palladium acetate. Further, Belgian Pat. No. 720,733 and Dutch Pat. No. 6,811,842 disclose improvements of these processes to increase the rate of reaction by addition of Bi or Te to the reaction system.

In these processes, however, palladium does not behave as a catalyst. Yields of acetates of aromatic compounds based on the palladium used do not exceed 100 %, in Example 6 of Belgian Pat. No. 696,832, Example 1 of British Pat. No. 1,167,428 and in Examples 1 – 10 of Dutch Pat. No. 6,811,842. Also, even in the example where flow method is conducted using the aforesaid palladium compound, the yields of acetates of aromatic compounds based on the palladium are remarkably low. Furthermore, Example 4 of British Patent 1,167,428 shows that a starting compound having a substituent in the benzene nucleus, for example, toluene, gives not tolyl acetate where acetyl group is introduced into the benzene nucleus, but benzyl acetate where acetate group is introduced in the side chain of benzene nucleus, as long as palladium acetate is used alone. The process disclosed in the aforesaid patent is not an excellent method for introducing acetate group into the benzene nucleus, so far as at least two points above mentioned are concerned.

Ichikawa et al. [J. Chem. Soc. of Japan, 90 (No. 2) p. 212] disclose a reaction where acetate group is introduced into the benzene nucleus using palladium nitrate as a catalyst. The yield of phenyl acetate based on the palladium employed is also below 100 %. Pd is not acting as a catalyst, as same as in the above patents. But, when toluene is used as a starting compound, tolyl acetate is apparently produced.

If palladium acts only as one of the reactants, it is necessary to recover and regenerate unaltered palladium and to return it to the reaction. Recycling very expensive precious metal is by no means commercially advantageous, taking into consideration loss of the metal during the recycling step. Under the circumstances, the present inventors conducted extensive studies on a method of recycling palladium within the reaction system in order to overcome the above-mentioned drawbacks.

According to the present invention, aromatic compounds, acetic acid and the oxygen-containing gas are reacted in the presence of metallic palladium or a palladium compound together with a small amount of nitric acid or an alkali nitrate. An alkali salt of aliphatic acid may be used together with palladium or its compound. The desired acetates of aromatic compounds are produced in high yield, and the palladium can be recycled without recovery, regeneration and so on.

The aromatic compounds as referred to herein include benzene, alkyl benzene or condensed aromatic compounds such as naphthalene, fluorene, anthracene and biphenyl.

For example, the present invention is represented by the following reaction scheme.

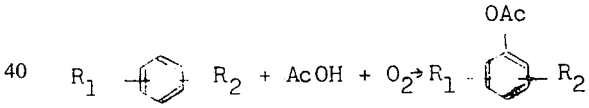

wherein $R_1$ and $R_2$ are individually hydrogen or lower alkyl group having 1 – 4 carbon atoms.

The above reaction scheme is illustrated in further detail in Table 1.

Table 1

| Run No. | Catalyst (amount used) | Amount of $HNO_3$ | Yield of phenyl acetate based on fed palladium (%) Reaction time | | |
|---|---|---|---|---|---|
| | | | 5 hr | 15 hr | 25 hr |
| 1 | Pd (OAc)$_2$ (0.2g) | — | 10 | 15 | 15 |
| 2 | Pd (NO$_3$)$_2$ (0.2g) | — | 60 | 75 | 70 |
| 3 | Pd (OAc)$_2$ — KNO$_3$ (0.2g) (0.5g) | — | 85 | 120 | 120 |
| 4 | Pd — SiO$_2$ (0.2g)(10cc) | — | 0 | Trace | Trace |
| 5 | Pd (NO$_3$)$_2$—KNO$_3$—SiO$_2$ (0.2g) (0.2g) (10cc) | — | 160 | 350 | 460 |
| 6 | Pd — SiO$_2$ (0.2g)(10cc) | 0.5 cc | 340 | 510 | 720 |

Reaction conditions: Reactor, a 100 cc microcylinder; Reaction temperature, 100°C;  /AcOH=20cc/20cc; and Oxygen pressure, 30 kg/cm$^2$ Table 1 shows that phenyl acetates are produced even when palladium acetate or palladium nitrate is used alone. The yields of these acetates based on the palladium are as high as 70 %. From the over-all point of view, the palladium is acting only as one of the reactants. In Run 3 where potassium nitrate is added, the yield of phenyl acetate based on the palladium increases to 120 %. It shows that the palladium is recycled. In Runs 4 and 5 where the catalysts are supported by carriers, the presence of a small amount of nitrate group in the system sharply increases the yields of desired products. In Run 6, the yield based on the palladium reaches as high as 720 %. Accordingly, the palladium does not serve as a reactant, but as a catalyst.

The alkyl benzenes as referred to herein include toluene, o-, m- and p-xylenes, ethylbenzene, o-, m- and p-ethyltoluene, o-, m- and p-diethylbenzene, cumene and t-butylbenzene.

The palladium compounds as used herein include oxide, hydroxide, acetate, propionate and nitrate. When metallic palladium is used, the palladium is provided by reducing a palladium salt supported by a porous carrier with a reducing agent, such as hydrogen, formalin, hydrazine or the like, and thereafter subjecting thoroughly the reduced product to an after-treatment. In this case, any salts including chlorides may be used.

The alkali salts of aliphatic acid as referred to herein, which are used as co-catalysts, include formate, acetate and propionate of lithium, sodium, potassium, rubidium and cesium. The amount of said alkali salt of aliphatic acid to be added is usually in the range of alkali atom/palladium = 30 - 1/10, preferably in the range of alkali atom/palladium atom = 10 - ½. These alkali salts may be added previously to the catalyst or to the reaction system separately. However, in the case where palladium salt supported by a carrier is reduced, addition of the aforesaid alkali salt is effected after completion of the reduction. These co-catalysts may be or may not be supported on carriers. It is, however, preferable to use these co-catalysts with carrier. In that case, the carriers used may be any of those conventionally employed in a catalytic reaction. They include activated carbon, silica, alumina, silica-alumina and the like.

The alkali nitrates which may be used herein include lithium nitrate, sodium nitrate, potassium nitrate, rubidium nitrate and cesium nitrate.

The concentration ratio of aromatic compounds to acetic acid is not critical. Gases other than oxygen which may be used herein include any of those not having direct adverse effects on the reaction, such as nitrogen, carbonic acid gas and the like.

$HNO_3$ or alkali nitrate may be added either to the reaction mixture or to the catalyst. When nitric acid or alkali nitrate is added directly to the reaction system, the amount thereof is preferably in the range of 0.2 – 0.001 mole, most preferably in the range of 0.1 – 0.002 mole per mole of acetic acid employed in the reaction.

On the other hand, when nitric acid or alkali nitrate is added to the catalyst, the amount thereof is in the range of 15 – 0.01 mole, most preferably in the range of 10 – 0.03 mole per mole of palladium employed.

The reaction may be conducted at a temperature between 30° and 300°C. The reaction proceeds preferably at a temperature between 50° and 250°C. The reaction may be carried out under normal pressure or under pressure. Furthermore, the present invention can be practiced either in liquid or in vapor phase. The reaction may also be effected according to any of methods, such as a flow method, a liquid and gas mixing and agitating method, a liquid phase gas blowing method and the like.

The principal products produced according to the present process include phenyl acetate from benzene; o- and p-tolyl acetates from toluene; 3,4-dimethyl phenyl acetate from o-xylene; 2,6-, 2,4- and 3,5-dimethyl phenyl acetates from m-xylene; 2,5-dimethyl phenyl acetate from p-xylene; o- and p-ethyl phenyl acetates from ethylbenzene; 3-methyl-4-ethyl phenyl acetate from o-ethyltoluene; 2-methyl-4-ethyl phenyl acetate and 2-ethyl-4-methyl phenyl acetate from m-ethyltoluene; 2-methyl-5-ethyl phenyl acetate and 2-ethyl-5-methyl phenyl acetate from p-ethyltoluene; 3,4-diethyl phenyl acetate from o-diethylbenzene; 2,4- and 3,5-diethyl phenyl acetates from m-diethylbenzene; and 2,5-diethyl phenyl acetate from p-diethylbenzene. Further, p-isopropyl phenyl acetate and p-t-butyl phenyl acetate are principal products from cumene and t-butylbenzene, respectively. Still further, the principal products produced according to the present process include α or β-acetoxynaphthalene from naphthalene; 2-acetoxyfluorene from fluorene; 9-acetoxyanthracene from anthracene; and 2 or 4-acetoxybiphenyl from biphenyl.

EXAMPLE 1

Into a 100 ml three-necked flask equipped with a thermometer, a reflux condenser and a gas-introducing pipe was charged a mixture comprising 30 cc of benzene, 10 cc of acetic acid, 0.5 g of palladium acetate and 2.0 g of potassium nitrate. While internal temperature of the flask was kept at 80°C, oxygen gas was introduced at a rate of 20 cc/min. through the gas-introducing pipe into said mixture. After a reaction for 20 hours was effected, the reaction mixture was treated according to ordinary procedure, whereby phenyl acetate was obtained in 130 % yield based on the palladium equivalent. In addition thereto, a small amount of biphenyl was detected as a by-product.

When the same process as above was repeated except that 2.0 g of potassium acetate was used in place of 2.0 g of the potassium nitrate, phenyl acetate was obtained at the end of 20 hours' reaction in only about 15 % yield.

EXAMPLE 2

0.1 Gram of palladium nitrate and 0.5 g of potassium nitrate were dissolved in a dilute aqueous nitric acid solution. To this solution was added 10 cc of granular silica gel, and the mixture was evaporated to dryness.

The thus obtained catalyst (10 cc) was charged into a microcylinder or microbomb (internal volume: 100 cc) made of chromium steel (SUS-32). The cylinder was sealed after addition of 20 cc of benzene and 20 cc of acetic acid. Into the cylinder was introduced oxygen gas until 40 kg/cm² (gauge). Subsequently, the cylinder was mounted on a shaking apparatus of an oil bath kept at a temperature of 100°C to effect a reaction for 16 hours. After the reaction was terminated, the reaction mixture was assayed and showed that phenyl acetate and biphenyl had been obtained in 380 and 40 % yields, respectively, based on the palladium equivalent. This reaction mixture subjected to the assay was returned again back into the cylinder. Oxygen gas was introduced thereinto until 40 kg/cm$^2$ (gauge) and the reaction was continued for additional 10 hours. As a result, the yields of phenyl acetate and biphenyl based on the palladium equivalent were increased to 510 and 55 %, respectively.

EXAMPLE 3

0.15 Gram of palladium acetate and 1.0 g of potassium nitrate were dissolved in dilute nitric acid. To this solution was added 20 cc of granular silica gel, and the mixture was evaporated to dryness. The catalyst thus obtained was charged into a microcylinder or microbomb (interval volume : 100 cc) made of chromium steel (SUS-32). The cylinder was sealed after 30 cc of toluene and 10 cc of acetic acid were added thereto. Into the cylinder was introduced oxygen gas until 55 kg/cm$^2$ (gauge). This cylinder was mounted on a shaking apparatus of an oil bath kept at a temperature of 120°C to effect a reaction for 16 hours. The reaction mixture was assayed, with the result that p-methyl phenyl acetate, o-methyl phenyl acetate, benzyl acetate and nitrotoluene had been formed in 180, 52, 32 and 16 % yields, respectively, based on the palladium. After the assay, the reaction mixture was returned back to the cylinder. The cylinder was replenished with oxygen gas until 55 kg/cm$^2$ (gauge), and the reaction was conducted for additional 10 hours. The reaction mixture was assayed, with the result that p-methyl phenyl acetate, o-methyl phenyl acetate, benzyl acetate and nitrotoluene had been formed in 270, 81, 50 and 23 % yields, respectively, based on the palladium.

EXAMPLE 4

0.2 Gram of palladium hydroxide, 0.2 g of lithium nitrate and 0.5 g of potassium nitrate were dissolved in a dilute aqueous nitric acid solution. To this solution was added 10 cc of granular activated carbon, and the mixture was evaporated to dryness. The catalyst thus prepared (10 cc) was charged into a hard glass U-shaped reactor (inside diameter; 8 mm, length; 20 cm). The reactor was placed in an oil bath kept at a temperature of 100°C, and a mixture comprising gaseous benzene, acetic acid, oxygen gas and nitrogen gas (volume ratio; 5 : 5 : 2 : 10) was fed thereto at a flow rate of 50 cc/min. The reaction mixture collected for 10 hours after the reaction was initiated was subjected to assay. Phenyl acetate was observed in an amount of 2.5 times the equivalent of palladium.

EXAMPLE 5

0.17 Gram of palladium chloride was dissolved in dilute hydrochloric acid. The solution was charged with 10 cc of granular silica gel and evaporated to dryness. The resulting product was charged with alkaline hydrazine hydrate. The mixture was reduced, washed thoroughly with water and then dried to prepare a catalyst. A mixture comprising 5 cc of the catalyst, 10 cc of benzene, 10 cc of acetic acid and 0.5 cc of commercially available conc. nitric acid was charged into a 50 cc microcylinder or microbomb. After the cylinder was sealed, oxygen gas was introduced through a valve provided on the upper part of the cylinder until 40 kg/cm$^2$ (gauge). This cylinder was placed in a shaking type oil bath kept at a temperature of 100°C to effect a reaction for 16 hours. After the reaction was completed, the reaction mixture was subjected to assay. Phenyl acetate was formed in 2.7 % yield based on the fed benzene (530 % yield based on the palladium), and nitrobenzene as a by-product in 1.1 % yield based on said benzene.

EXAMPLE 6

A solution of 0.1 g of palladium acetate in acetic acid was charged with 10 cc of granular activated carbon and evaporated to dryness, whereby a catalyst was prepared. A mixture comprising 10 cc of the catalyst, 5 cc of benzene, 10 cc of acetic acid and 0.5 cc of commercially available conc. nitric acid was charged into a 50 cc microcylinder or microbomb. Into the cylinder was introduced oxygen gas until 50 kg/cm$^2$ (gauge) through a valve provided on the upper part of the cylinder. This cylinder was placed in the same bath as in Example 5 to effect a reaction at 100°C for 16 hours. The reaction gave phenyl acetate in 4.6 % yield based on the fed benzene (= 400 % yield based on the palladium), and nitrobenzene in 1.8 % yield based on the fed benzene.

EXAMPLE 7

A solution of 0.2 g of palladium nitrate in a dilute nitric acid was charged with 10 cc of granular silica gel, and the mixture was evaporated to dryness, whereby a catalyst was prepared. A mixture comprising 10 cc of the catalyst, 5 cc of benzene, 10 cc of acetic acid and 0.3 cc of commercially available conc. nitric acid was charged into the same cylinder as in Example 5. Into the cylinder was introduced oxygen gas until 40 kg/cm$^2$ (gauge), and a reaction was conducted at a temperature of 110°C for 3 hours. Assay of the reaction mixture showed that phenyl acetate was formed in 2.7 % yield based on the fed benzene (= 265 % yield based on the palladium), and nitrobenzene in 0.9 % yield based on the fed benzene. After the assay, said reaction mixture was returned back into the cylinder. A given amount of oxygen gas was replenished. The reaction was conducted for additional 15 hours. As a result, phenyl acetate was formed in 8.7 % yield based on the benzene (= 855 % yield base on the palladium) and nitrobenzene in 2.9 % yield based on the benzene.

The same procedure as above was repeated except that the nitric acid was not used. Phenyl acetate was obtained in 0.4 % yield based on the benzene, at the lapse of 3 hours after the reaction was initiated, and in 1.0 % yield (98 % yield based on the palladium) at the lapse of 18 hours. A few nitrobenzene was observed. No increase was seen in yield even when the reaction was continued further.

EXAMPLE 8

A hard glass reactor of 1 cm in inner diameter and 30 cm in length was charged with 10 cc of the same catalyst as in Example 5. The reactor was controlled to maintain its internal temperature at 150°C. Into the reactor was introduced at a rate of 60 cc/min. under normal pressure a vapor mixture of benzene, acetic acid, oxygen and conc. nitric acid (molar ratio = 10 : 20 : 20: 1). At a lapse of 2 hours after the reaction was initiated, phenyl acetate was obtained in 1.8 % yield (one-pass yield) based on the benzene. No reduction in activity of the catalyst was observed even after an overnight run or longer. Nitrobenzene was obtained in 0.8 % yield (one-pass yield) based on the benzene.

EXAMPLE 9

A solution of 0.17 g of palladium chloride in dilute hydrochloric acid was charged with 10 cc of granular silica gel. The mixture was evaporated to dryness. Subsequently, the dried product was charged with alkaline hydrazine hydrate and reduced. After the product was thoroughly washed with water, it was dried to prepare a catalyst. A mixture comprising 5 cc of the catalyst, 10 cc of toluene, 10 cc of acetic acid and 0.5 cc of commercially available conc. nitric acid was charged into a 50 cc microcylinder or microbomb. After the cylinder was sealed, oxygen gas was supplied through the upper valve provided thereon until 40 kg/cm² (gauge). This cylinder was placed in a shaking type oil bath controlled at a temperature of 100°C, and a reaction was conducted for 16 hours. After the reaction was completed, the reaction mixture was subjected to assay. As a result, it was found that there were formed o-methyl phenyl acetate, m-methyl phenyl acetate, p-methyl phenyl acetate and benzaldehyde in 0.65, 0.43, 1.62 and 0.23 % yields, respectively, based on the fed toluene. It was also found that nitrotoluene as a by-product was formed in 0.23 % of yield based on the toluene.

EXAMPLES 10 – 19

Using 5 cc of the same catalyst as in Example 9, reactions of alkyl benzenes, such as xylenes, ethylbenzenes, ethyltoluenes and diethylbenzenes, were effected respectively, under oxygen pressure of 40 kg/cm² in the same microcylinder or microbomb as in Example 9. The results are shown in Table 2.

EXAMPLE 20

0.1 Gram of palladium nitrate and 0.2 g of lithium nitrate were dissolved in water, and 10 cc of granular silica gel was added thereto. The mixture was evaporated to dryness, whereby a catalyst was prepared.

A hard glass reactor of 10 mm in inner diameter and 300 mm in length was charged with 10 cc of the above-mentioned catalyst, and the reactor was controlled to maintain its internal temperature at 150°C. Into this reactor was introduced a vapor or gas mixture comprising benzene, acetic acid, oxygen gas and conc. nitric acid (molar ratio = 10 : 20 : 30 : 1) under normal pressure at a rate of 60 cc/min. Phenyl acetate and nitrobenzene were obtained in 1.2 and 0.2 % yields (one-pass yield), respectively, based on the benzene, at a 3 hours lapse after the reaction was initiated.

EXAMPLES 21 – 28

Using various catalysts, vapor phase reactions were effected under the same conditions as in Example 20 to obtain the results as shown in Table 3.

In column of reaction result of the table, one-pass yield represents a yield based on the fed benzene, and selectivity represents a yield of phenyl acetate obtained based on the reacted benzene.

Table 2

| Exm. No. | Alkyl benzene (cc) | Acetic acid (cc) | Nitric acid or alkali nitrate | Temperature (°C) | Reaction time (hr) | Principal product | Yield based on alkyl benzene (%) | Yield based on palladium (%) |
| --- | --- | --- | --- | --- | --- | --- | --- | --- |
| 10 | Ethyl-benzene (10) | 20 | HNO₃, 0.5 cc | 120 | 15 | o-Ethyl phenyl acetate<br>p-Ethyl phenyl acetate | 0.5<br>1.4 | 300 |
| 11 | o-Diethyl-benzene (10) | 20 | " | 100 | 5 | 3,4-Diethyl phenyl acetate | 0.9 | 120 |
| 12 | m-Diethyl-benzene (5) | 35 | " | 100 | 20 | 2,4-Diethyl phenyl acetate<br>3,5-Diethyl phenyl acetate | 1.7<br>1.0 | 170 |
| 13 | p-Diethyl-benzene (20) | 5 | " | 150 | 5 | 2,5-Diethyl phenyl acetate | 0.8 | 205 |
| 14 | o-Xylene (10) | 10 | CsNO₃, 0.3 g | 100 | 10 | 3,4-Dimethyl phenyl acetate | 2.5 | 410 |
| 15 | m-Xylene (20) | 10 | NaNO₃, 0.3 g | 120 | 5 | 2,4-Dimethyl phenyl acetate<br>3,5-Dimethyl phenyl acetate | 1.1<br>0.8 | 560 |
| 16 | p-Xylene (10) | 10 | " | 110 | 5 | 2,5-Dimethyl phenyl acetate | 0.9 | 150 |
| 17 | o-Ethyl-toluene (10) | 20 | RbNO₃, 0.1 g | 130 | 10 | 3-Methyl-4-ethyl phenyl acetate<br>3-Ethyl-4-methyl phenyl acetate | 1.6<br>1.2 | 410 |
| 18 | m-Ethyl-toluene (10) | 20 | " | 130 | 10 | 2-Methyl-4-ethyl phenyl acetate<br>2-Ethyl-4-methyl phenyl acetate | 0.8<br>0.5 | 290 |
| 19 | p-Ethyl-toluene (10) | 20 | HNO₃, 0.1 cc | 130 | 10 | 2-Methyl-5-ethyl phenyl acetate<br>2-Ethyl-5-methyl phenyl acetate | 0.4<br>0.3 | 105 |

All the catalysts used in these examples were prepared according to the same method as in Example 20.

Table 3

| Exm. No. | Catalyst component (amount used) | Reaction conditions | | | | | | Reaction results (after the lapse of 3 hours) | | |
|---|---|---|---|---|---|---|---|---|---|---|
| | | Composition of starting gas (molar ratio) | | | | Reaction temperature (°C) | Space Velocity ($hr^{-1}$) | one-pass yield (%) | | Selectivity of phenyl acetate (%) |
| | | Benzene | Acetic acid | Oxygen | Nitric acid | | | Phenyl acetate | Nitrobenzene | |
| 21 | Pd - Cs formate (0.1 g) (0.3 g) - $SiO_2$ (10 cc) | 5 | 30 | 50 | 2 | 180 | 450 | 2.0 | 0.3 | 87 |
| 22 | Pd - Li formate (0.1 g) (0.5 g) - $Al_2O_3$ (10 cc) | 10 | 30 | 50 | 2 | 180 | 600 | 0.9 | 0.1 | 90 |
| 23 | Pd - Na acetate (0.1 g) (0.2 g) - $SiO_2$ (10 cc) | 5 | 30 | 50 | 2 | 180 | 450 | 1.7 | 0.2 | 89 |
| 24 | Pd - K acetate (0.1 g) (0.2 g) - $SiO_2/Al_2O_3$ (5 cc) | 10 | 10 | 30 | 1 | 190 | 300 | 1.4 | 0.2 | 88 |
| 25 | Pd - Rb acetate (0.2 g) (0.2 g) - $SiO_2$ (10 cc) | *5 | 10 | 30 | 1 | 170 | 400 | 2.3 | 0.4 | 85 |
| 26 | Pd - Cs acetate (0.1 g) (0.1 g) - Activated carbon (10 cc) | 20 | 20 | 10 | 2 | 150 | 450 | 1.5 | 0.2 | 88 |
| 27 | Pd acetate (0.1 g) - Na acetate (0.1 g) - K acetate - $SiO_2$ (0.1 g) ($10^2$ cc) | 10 | 30 | 50 | 2 | 150 | 900 | 0.7 | 0.1 | 87 |
| 28 | Pd nitrate (0.1 g) - Cs acetate - $Al_2O_3$ (0.1 g) (5 cc) | *5 | 20 | 50 | 2 | 170 | 300 | 2.5 | 0.5 | 81 |
| control | Pd - $SiO_2$ (0.1 g) (10 cc) | 5 | 30 | 50 | 2 | 180 | 450 | 1.9 | 1.1 | 63 |

EXAMPLE 29

A mixture comprising 5 cc of the same catalyst as used in Example 5, 10 g of naphthalene, 10 cc of acetic acid and 0.6 cc of commercially available conc. nitric acid was charged into a microbomb having a capacity of 50 cc. After the bomb was sealed, oxygen gas was introduced through a valve provided on the upper part of the bomb until 50 kg/cm² (gauge). This bomb was placed in a shaking type oil bath kept at a temperature of 120°C to effect a reaction for 20 hours. After the reaction was completed, the reaction mixture was subjected to assay. α-acetoxynaphthalene and β-acetoxynaphthalene were formed in 210 % and 82 % yields based on the palladium, and nitronaphthalene as a by-product in 85 % yield based on the palladium, respectively.

EXAMPLE 30

A mixture comprising 10 cc of the same catalyst as used in Example 6, 5 g of naphthalene, 10 cc of acetic acid and 0.6 cc of commercially available conc. nitric acid was charged into a 50 cc microcylinder or microbomb. Into the cylinder was introduced oxygen gas until 55 kg/cm² (gauge) through a valve provided on the upper part of the cylinder. This cylinder was placed in the same bath as in Example 29 to effect a reaction at 120°C for 16 hours. The reaction gave α-acetoxynaphthalene, β-acetoxynaphthalene and nitronaphthalene in 290, 80 and 110 % yields based on the palladium, respectively.

EXAMPLE 31

A mixture comprising 10 cc of the same catalyst as used in Example 7, 5 g of fluorene, 10 cc of acetic acid and 0.3 cc of commercially available conc. nitric acid was charged into the same cylinder as in Example 29. Into the cylinder was introduced oxygen gas until 40 kg/cm² (gauge), and a reaction was conducted at a temperature of 110°C for 20 hours. Assay of the reaction mixture showed that 2-acetoxyfluorene and nitrofluorene were formed in 160 % and 82 % yields based on the palladium, respectively.

EXAMPLES 32 – 38

Reactions of condensed aromatic compounds, such as naphthalene, fluorene, anthracene and biphenyl, were effected respectively, in the same microbomb as in Example 29. The results are shown in Table 4.

Table 4

| Exm. No. | Catalysts | Condensed aromatic compound (g) | Acetic acid (cc) | Nitric acid (cc) | $O_2$ pressure (kg/cm2) | Temp (°C) | Reaction time (hr) | Principal product | Yield based on palladium (%) |
|---|---|---|---|---|---|---|---|---|---|
| 32 | Pd acetate- (0.1 g) active carbon (10cc) | biphenyl 5 | 10 | 0.5 | 50 | 150 | 19 | 2-acetoxybiphenyl 4-acetoxybiphenyl nitrobiphenyl | 160 180 92 |
| 33 | Pd nitrate-SiO₂ (0.2g) (10cc) | anthracene 5 | 10 | 0.3 | 40 | 110 | 20 | 9-acetoxyanthracene nitroanthracene | 180 81 |
| 34 | (Pd-SiO₂) KOAc (0.5g)(5cc)(0.15g) | biphenyl 10 | 10 | 0.5 | 40 | 150 | 16 | 2-acetoxybiphenyl 4-acetoxybiphenyl nitrobiphenyl | 110 420 15 |
| 35 | Pd acetate- (0.1g) Na acetate-carbon (0.5g) (10cc) | naphthalene 5 | 10 | 0.6 | 50 | 120 | 16 | α-acetoxynaphthalene β-acetoxynaphthalene nitronaphthalene | 360 120 10 |
| 36 | (Pd nitrate-SiO₂) (0.2g) (10cc) K Propionate (0.2g) | fluorene 5 | 10 | 0.3 | Air 40 | 170 | 20 | 2-acetoxyfluorene nitrofluorene | 460 15 |
| 37 | Pd nitrate- (0.1g) Li nitrate-Al₂O₃ (0.5g) (10cc) | anthracene 5 | 10 | 1.0 | $O_2$ 50 | 100 | 5 | 9-acetoxyanthracene nitroanthracene | 160 trace |
| 38 | (Pd-SiO₂) (0.1g) (10cc) Cs formate (0.2g) | bophenyl 5 | 20 | 1.0 | 50 | 130 | 5 | 2-acetoxybiphenyl 4-acetoxybiphenyl nitrobiphenyl | 205 360 20 |

What is claimed is:

1. A process for preparing acetates of hydrocarbon aromatic compounds which comprises reacting at least one hydrocarbon aromatic compound with acetic acid and a molecular oxygen-containing gas, at a temperature between 30° and 300°C in the presence of a catalyst consisting of palladium or a compound thereof and $XNO_3$ in which X is hydrogen or alkali metal.

2. A process according to claim 1 wherein the hydrocarbon aromatic compound is selected from benzenes represented by the formula,

wherein $R_1$ and $R_2$ are individually hydrogen or lower alkyl group having 1 – 4 carbon atoms.

3. A process according to claim 1, wherein the hydrocarbon aromatic compound is a member selected from the group consisting of naphthalene, fluorene, anthracene and biphenyl.

4. A process according to claim 1, wherein the compound of palladium is a member selected from the group consisting of oxide, hydroxide and nitrate of palladium.

5. A process according to claim 1, wherein the compound of palladium is a member selected from the group consisting of acetate and propionate of palladium.

6. A process according to claim 1, wherein the alkali nitrate is a member selected from the group consisting of nitrates of lithium, sodium, potassium, rubidium and cesium.

7. A process according to claim 1, wherein the nitric acid compound is added directly in an amount of from 0.2 to 0.001 mole per mole of acetic acid to the reaction system.

8. A process according to claim 1, wherein the nitric acid compound is added in an amount of from 0.01 to 15 moles per mole of palladium to the catalyst system.

9. A process according to claim 1, wherein said palladium or a compound thereof is supported on a porous carrier of activated carbon, silica, alumina or silica-alumina.

10. A process according to claim 1, wherein said molecular oxygen-containing gas is introduced under superatmospheric pressure.

11. A process according to claim 1, wherein said molecular oxygen-containing gas is bubbled through the reaction mixture.

12. A process for preparing acetates of hydrocarbon aromatic compounds which comprises reacting at least one hydrocarbon aromatic compound with acetic acid and a molecular oxygen-containing gas, at a temperature between 30° and 300°C in the presence of a catalyst consisting of a palladium or a compound thereof to which has been added an alkali aliphatic acid salt selected from the group consisting of formates, acetates and propionates of lithium, sodium, potassium, rubidium and cesium and $XNO_3$ in which X is hydrogen or alkali metal.

13. A process according to claim 12, wherein the hydrocarbon aromatic compound is selected from benzenes represented by the formula

wherein $R_1$ and $R_2$ are individually hydrogen or lower alkyl group having 1 – 4 carbon atoms.

14. A process according to claim 12, wherein the hydrocarbon aromatic compound is a member selected from the group consisting of naphthalene, fluorene, anthracene and biphenyl.

15. A process according to claim 12, wherein the compound of palladium is a member selected from the group consisting of oxide, hydroxide and nitrate of palladium.

16. A process according to claim 12, wherein the compound of palladium is a member selected from the group consisting of acetate and propionate of palladium.

17. A process according to claim 12, wherein the alkali nitrate is a member selected from the group consisting of nitrates of lithium, sodium, potassium, rubidium and cesium.

18. A process according to claim 12, wherein the nitric acid compound is added in an amount of from 0.2 to 0.001 mole per mole of acetic acid to the reaction system.

19. A process according to claim 1, wherein the hydrocarbon aromatic compound is benzene.

20. A process according to claim 19, wherein the compound of palladium is palladium acetate.

21. A process according to claim 20, wherein the alkali nitrate is potassium nitrate.

22. A process according to claim 21, wherein the temperature is 80°C.

23. A process according to claim 22, wherein phenyl acetate is produced in 130% yield based on the palladium equivalent.

24. A process according to claim 12, wherein the alkali aliphatic acid salt is used in an amount within the range of alkali atom/palladium atom = 30 – 1/10.

25. A process according to claim 12, wherein said alkali aliphatic acid salt and said palladium or the compounds thereof are supported on a catalyst of activated carbon, silica, alumina or silica-alumina.

* * * * *

UNITED STATES PATENT OFFICE
CERTIFICATE OF CORRECTION

Patent No. 3,887,608      Dated June 3, 1975

Inventor(s) Naoya KOMINAMI, Nobuhiro TAMURA and Etsuo YAMAMOTO

It is certified that error appears in the above-identified patent and that said Letters Patent are hereby corrected as shown below:

Title page as it reads now:

[30]      Foreign Application Priority Data

| Date | Country | Number |
|---|---|---|
| June 9, 1969 | Japan | 44-44644 |
| June 9, 1969 | Japan | 44-44645 |
| Nov. 5, 1969 | Japan | 44-88113 |
| Feb. 4, 1970 | Japan | 45-9304 |
| Nov. 17, 1969 | Japan | 44-91460 |
| Dec 27, 1969 | Japan | 44-104827 |
| Aug 13, 1970 | Japan | 45-70419 |

Title page as it should read:

[30]      Foreign Application Priority Data

| Date | Country | Number |
|---|---|---|
| June 9, 1969 | Japan | 44-44644 |
| June 9, 1969 | Japan | 44-44645 |
| Nov. 5, 1969 | Japan | 44-88113 |
| Feb. 4, 1970 | Japan | 45-9304 |
| Nov. 17, 1969 | Japan | 44-91409 |
| Dec. 27, 1969 | Japan | 44-104827 |
| Aug. 13, 1970 | Japan | 45-70419 |

Signed and Sealed this second Day of December 1975

[SEAL]

Attest:

RUTH C. MASON
*Attesting Officer*

C. MARSHALL DANN
*Commissioner of Patents and Trademarks*